Patented Oct. 24, 1939

2,177,240

UNITED STATES PATENT OFFICE 2,177,240

WAX AND LIKE COMPOSITION AND METHOD FOR PREPARING THE SAME

Homer Clark Brumbaugh, Baltimore, Md., assignor to Universal Chemical Corporation, Akron, Ohio, a corporation of Ohio No Drawing. Application May 17, 1939, Serial No. 274,211

2 Claims. (Cl. 134—1)

This invention relates to wax and like compositions in which waxes, resins or gums are emulsified in water or water solutions for use as floor, furniture and automobile polishes, leather dressings, and as sizing and sealing compounds, and to procedure for producing the same.

The general purpose of the invention is to provide such compositions in which is an emulsifying agent for producing a composition which will have small particle size whereby it will be bright-drying on smooth, hard neutral surfaces and will be highly water-proof or water-repellent due to volatilization or de-composition of the emulsifying agent from or in the composition under atmospheric conditions whereby the wax, resin or gum compositions are highly resistant to re-emulsification in water, either hot or cold.

The foregoing and other purposes of the invention are attained in and by the compositions and methods described in the following paragraphs hereof. It is to be understood that the specific composition and method set forth in detail is illustrative and not to be taken as limiting the invention excepting as set forth in the appended claims.

The present inventor has discovered that an emulsifying agent, to be completely satisfactory in use in such compositions and particularly which will produce bright-drying waxes, etc., and at the same time waxes, etc., which will be water-proof or water repellent, must have the following properties:

(a) The emulsifying agent must substantially and permanently lose, under atmospheric conditions, its ability to re-emulsify the compositions.

(b) The emulsifying agent must produce an emulsion in which the ingredients are of such small particle size as to be bright and to have a high lustre upon drying without rubbing or polishing.

(c) The composition must be stable when stored for periods of time (for example, in cans) in a condition in which it is more or less protected from the air, and in this connection the emulsifying agent should not evaporate selectively with respect to water or the water solution used.

(d) The agent used should produce a coating of wax or the like of good appearance and which is long-wearing.

(e) The emulsifying agent should produce a composition of a consistency whereby it is simply and easily applied and maintained on a surface.

(f) The emulsifying agent should produce a composition which will be chemically substantially inert to the surface upon which it is applied.

(g) The emulsifying agent should produce a compound unobjectionable as to odor and without toxic or other harmful effect upon the user.

(h) The composition, including the improved emulsifying agent, must be economical as to cost of manufacture and distribution.

A typical example of an emulsion such as the above and prepared with an emulsifier as described is a floor wax emulsion of which the formula and method of manufacture follow:

Formula

| | | |
|---|---|---|
| No. 1 Yellow Carnauba wax | lbs | 96 |
| Triple distilled oleic acid | lbs | 20 |
| Morpholine (diethylene-imede oxide) | lbs | 20 |
| Sufficient soft or distilled water to make | gallons | 100 |

The wax and oleic acid are melted with gentle heat, preferably in a steam jacketed kettle. The temperature should not exceed 105 degrees centigrade at any time. The heat is then controlled so as to bring the temperature to 105 degrees centigrade. Heating is then discontinued and the morpholine is slowly added with continuous gentle but thorough agitation; this agitation being continued for three minutes after the last has been added. The temperature will have dropped to about 98 degrees centigrade. The temperature is adjusted to 98 degrees centigrade if it varies by more than plus or minus one degree. The morpholine is wax-soluble to such an extent as to produce wax emulsions of very small particle size. Six gallons of boiling water are then added at a slow regular rate over a period of about three minutes, agitating continuously as above and for approximately five minutes thereafter. The remainder of the water at boiling temperature is then added very rapidly (in about 10 seconds) and stirring is continued until the emulsion is homogeneous and none of the concentrated emulsion mixture remains undispersed. The entire quantity is then cooled to room temperature by pumping it through cooled coils or other suitable cooling equipment. This cooling process should preferably be as rapid as is practical requiring not more than 5 to 10 minutes.

Modifications of the invention may be resorted to without departing from the spirit thereof or the scope of the appended claims. It has been found that morpholine and its derivatives or homologues and also monobutylamine alone or in combination with ethylene diamine, when used in composition in waxes such as candelilla and montan as well as carnauba, with the fatty acids, such as linoleic, lauric, myristic, linseed fatty, have the above-discovered properties, but the invention is not to be limited to these specific materials excepting as required by the claims.

This case is a continuation in part of application Serial No. 160,141, filed by the present inventor on August 20, 1937.

What is claimed is:

1. A wax composition comprising an emulsion of wax in water having therein as an emulsifying agent a morpholine compound with a fatty acid of high molecular weight, holding the wax dispersed in such small particle size that it will dry bright or with substantial lustre when merely applied to a surface and exposed to the atmosphere without rubbing, said emulsifying agent being decomposable by drying of the composition whereby the composition loses its ability to re-emulsify in the presence of water.

2. A wax composition comprising an emulsion of wax in water having therein as an emulsifying agent an unstable volatile amino compound with a fatty acid of high molecular weight, forming a wax-soluble soap, so as to hold the wax dispersed in such small particle size that it will dry bright or with substantial lustre when merely applied to a surface and exposed to the atmosphere without rubbing, said emulsifying agent being stable in the presence of the water and not evaporating selectively in water solution but decomposable by the drying of the composition whereby the composition loses its ability to re-emulsify in the presence of water.

HOMER CLARK BRUMBAUGH.